United States Patent
Kozak et al.

[11] Patent Number: 5,945,170
[45] Date of Patent: Aug. 31, 1999

[54] PROCESS FOR SEPARATING MULTIVALENT METAL IONS FROM AUTODEPOSITION COMPOSITIONS AND PROCESS FOR REGENERATING ION EXCHANGE RESINS USEFUL THEREWITH

[75] Inventors: William G. Kozak, Hatfield; Christina M. Haas, Collegeville, both of Pa.; Bashir M. Ahmed, Utica, Mich.

[73] Assignee: Henkel Corporation, Gulph Mills, Pa.

[21] Appl. No.: 08/958,710

[22] Filed: Nov. 17, 1997

Related U.S. Application Data

[63] Continuation of application No. 08/768,561, Dec. 18, 1996, abandoned, which is a continuation of application No. 08/427,480, Apr. 24, 1995, abandoned, which is a continuation-in-part of application No. 08/102,662, Aug. 5, 1993, Pat. No. 5,409,737, which is a continuation-in-part of application No. 07/847,543, Mar. 19, 1992, abandoned.

[51] Int. Cl.⁶ ................................................. B05D 1/18
[52] U.S. Cl. ..................... 427/437; 427/352; 427/443.1
[58] Field of Search ............................ 427/352, 437, 427/443.1

[56] References Cited

U.S. PATENT DOCUMENTS

| | | | |
|---|---|---|---|
| 3,617,368 | 11/1971 | Gibbs et al. ............................ | 117/161 |
| 3,839,097 | 10/1974 | Hall et al. ................................ | 148/6.2 |
| 3,922,451 | 11/1975 | Anschutz et al. ........................ | 428/35 |
| 4,303,704 | 12/1981 | Courduvelis et al. .................. | 427/345 |
| 5,393,416 | 2/1995 | Kozak et al. ........................... | 210/96.1 |
| 5,409,737 | 4/1995 | Kozak et al. ........................... | 427/435 |

FOREIGN PATENT DOCUMENTS

| | | | |
|---|---|---|---|
| 2017026 | 5/1990 | Canada .......................... | C25D 13/06 |
| 54-024283 | 2/1979 | Japan ................................. | B01J 1/09 |

OTHER PUBLICATIONS

"Ion–Exchange Separations", R.E. Anderson, Handbook of Separation Techniques for Chemical Engineers (McGraw–Hill, New York, 1979).
Ion Exhange Resins AMBERLITE ® –718 (Rohm & Haas Co., Philadelphia, 1988).

*Primary Examiner*—Benjamin Utech
*Assistant Examiner*—Lynette T. Umez-Eronini
*Attorney, Agent, or Firm*—Wayne C. Jaeschke; Norvell E. Wisdom, Jr.; Wayne C. Jaeschke, Jr.

[57] ABSTRACT

The use of selected cation exchange resins to remove dissolved multivalent cations ions such as iron, zinc, and chromium from used autodeposition compositions permits reuse of the autodeposition compositions without the need for added surfactant and without developing any undesirable graininess or other texture in the coatings formed. Iminodiacetate cation exchange resins are very effective for removing iron ions when they are the only multivalent ions to be removed, and can be efficiently regenerated with 0.5 to 4% by weight aqueous hydrofluoric acid. By proper choice of other cation exchange resins and operating conditions, zinc can be selectively extracted from autodeposition baths containing both iron and zinc, and either iron or zinc can be selectively displaced from the loaded ion exchange resin.

19 Claims, 4 Drawing Sheets

PROCESS FOR SEPARATING MULTIVALENT METAL IONS FROM AUTODEPOSITION COMPOSITIONS AND PROCESS FOR REGENERATING ION EXCHANGE RESINS USEFUL THEREWITH

CROSS-REFERENCE TO RELATED APPLICATIONS

This application is a continuation of Ser. No. 08/768,561, filed Dec. 18, 1996, now abandoned; which was a continuation of Ser. No. 08/427,480, filed Apr. 24, 1995, now abandoned; which was a continuation-in-part of Ser. No. 102,662, filed Aug. 5, 1993, which issued as U.S. Pat. No. 5,409,737. Ser. No. 102,662 was a continuation-in-part of application Ser. No. 847,543, filed Mar. 6, 1992, and now abandoned.

BACKGROUND OF THE INVENTION

1. Field of the Invention

This invention relates to processes for separating from autodeposition compositions dissolved and/or dispersed metal ions having a valence of two or higher (this type of metal ions being briefly denoted hereinafter as "multivalent"), particularly iron, chromium, and/or zinc cations, more particularly iron and zinc. The invention also relates to regenerating to their acid form cation exchange resins, particularly those containing iminodiacetate (alternatively called "iminodiacetic acid"), aminophosphonic acid, and sulfonic acid functional groups, after the cation exchange resins have been at least partially loaded with multivalent metal cations, particularly with iron, chromium, and/or zinc cations. In some embodiments of particular interest, the invention relates to regenerating such ion exchange resins that have been used to remove iron, chromium, and/or zinc cations from autodeposition baths.

2. Statement of Related Art

Autodeposition involves the use of an aqueous resinous coating composition of relatively low solids concentration (usually less than about 10%) to form a coating of relatively high solids concentration (usually greater than about 10%) on a metallic surface immersed therein, with the coating increasing in thickness and areal density (i.e., mass per unit area of coating) the longer the time the metallic surface is immersed in the composition. Autodeposition is somewhat similar in its results to electrodeposition, but autodeposition does not require the aid of external electrical current to cause the resin particles to deposit on the metal surface.

In general, autodepositing compositions are aqueous acid solutions having solid resin particles dispersed therein in very finely divided form. The coating formed while the metal substrate being coated is immersed in the bath is generally wet and fairly weak, although sufficiently strong to maintain itself against gravity and moderate spraying forces. In this state the coating is described as "uncured". To make an object coated by autodeposition suitable for normal practical use, the uncured coating is dried, usually with the aid of heat. The coating is then described as "cured".

Basic constituents of an autodepositing composition are water, resin solids dispersed in the aqueous medium of the composition, and activator, that is, an ingredient or ingredients which convert the composition into one which will form on a metallic surface a resinous coating which increases in thickness or areal density as long as the surface is immersed in the composition. Various types of activators or activating systems are known. The activating system generally comprises an acidic oxidizing system, for example: hydrogen peroxide and HF; $HNO_3$; a ferric ion containing compound and HF; and other combinations of (i) soluble metal containing compounds such as, for example, silver fluoride, ferrous oxide, cupric sulfate, cobaltous nitrate, silver acetate, ferrous phosphate, chromium fluoride, cadmium fluoride, stannous fluoride, lead dioxide, and silver nitrate, in an amount between about 0.025 and about 50 grams per liter (hereinafter often abbreviated as "g/L"), with (ii) one or more acids such as hydrofluoric, sulfuric, hydrochloric, nitric, and phosphoric acids and organic acids such as, for example, acetic, chloroacetic, and trichloroacetic acids.

The use of autodeposition to coat metal objects containing iron, chromium, and/or zinc causes some dissolution of the objects and therefore increases the concentrations of one or more of these ions in the coating bath. Such increased concentrations of these ions, if sufficiently large, cause the baths to produce unsatisfactory coatings or even to coagulate and thereby become unsuitable for continued use. Removal of these accumulating metal ions is therefore necessary to permit prolonged satisfactory use of an autodeposition bath.

U.S. Pat. No. 3,839,097 of Oct. 1, 1974 to Hall et al. teaches the stabilization of autodeposition baths by removing metal ions therefrom with an ion exchange resin, then regenerating the ion exchange resin by treating it with an aqueous solution of a strong acid. The entire specification of this patent, to the extent not inconsistent with any explicit statement herein, is hereby incorporated into this specification by reference. Sulfuric, phosphoric, hydrochloric, and nitric acids are specifically recommended in this reference for regenerating the ion exchange resins, with 20% by weight sulfuric acid apparently highly preferred, in view of its use in all the examples in which regeneration is described. Similarly, although several types of ion exchange resins are taught by this reference as suitable, only sulfonic acid type resins are used in working examples. This reference teaches that removal of metal cations from an autodeposition bath by use of a cation exchange resin should be supplemented by addition to the bath of dispersing agent(s) selected from the group consisting of cationic and amphoteric surfactants and protective colloids, in order to maintain long term stability and avoid the development of a grainy or textured appearance of the coatings formed by the bath on metal substrates after the bath has been in contact with a cation exchange resin. (The surfactants normally used to stabilize the coating resins in aqueous dispersion in freshly prepared autodeposition baths, in contrast, have always or almost always been anionic surfactants for all autodeposition compositions of practical interest.)

The general use of ion exchange resins has been reviewed by R. E. Anderson in Section 1.12, "Ion exchange Separations", in P. A. Schweitzer (ed.), *Handbook of Separation Techniques for Chemical Engineers* (McGraw-Hill, New York, 1979). Iminodiacetate resins in particular are described on pages 1–384—1–385 in this reference.

A published product Bulletin, *Ion Exchange Resins AMBERLITE® IRC*-718 (Rohm & Haas Co., Philadelphia, 1988), is believed to be typical of current manufacturers' recommendations for use and regeneration of commercial iminodiacetate functional resins. This shows that, at pH 2, iron(III) cations are the most tightly bound to this resin among all commonly occurring cations and states that, for regeneration, "the amount of acid required is higher than that required for conventional weakly acidic ion exchange resins. A regeneration level of 6 to 10 lbs. $HCl/ft^3$ may be sufficient for metals with moderate selectivity, but this should be increased slightly for tightly held metals. . . . Acid concentration should be 5 to 15 percent, with higher concentrations needed for more tightly bound species."

Published Canadian Patent Application 2,017,026 describes extraction of iron and other metals from electrodeposition baths using iminodiacetate type ion exchange resins. This reference teaches (page 5) that the resins may be regenerated with 20% by weight sulfuric acid solution in water, but otherwise devotes little attention to the regeneration step.

U.S. Pat. No. 4,303,704 of Dec. 1, 1981 to Courduvelis et al. teaches removing complexed copper or nickel from aqueous solutions by passage through a bed of—iminodiacetate type ion exchange resin. This teaches that, "Preferably, a 0.5 to 20% solution of sulfuric acid or other strong acid is used as the eluent."

Japanese Laid Open Application No. 54-24,283, according to an abstract thereof, teaches regenerating ion exchange resins suitable for removing iron compounds from aqueous solutions, using as regenerant an aqueous solution of an aminopolycarboxylic acid, such as hydroxyethylethylenediaminetriacetic acid, nitrilotriacetic acid, cyclohexanediaminetetraacetic acid, or a water soluble salt of such an acid.

DESCRIPTION OF THE INVENTION

Objects of the Invention

One object of this invention is to provide an improved means for separating multivalent metal cations, particularly iron, zinc, and chromium cations, more particularly iron and zinc cations, from autodeposition baths (an alternative term for autodeposition compositions) that have been used to coat metal objects that introduce such metal cations into the baths, in order to permit prolonged use of the autodeposition baths by replacing their content of resin and other components that are actually incorporated into the autodeposited coatings formed by the baths or are consumed by the chemical reactions that accompany formation of the autodeposited coatings. Another object of the invention is to provide a more economical method of regenerating cation exchange resins, especially chelating type cation exchange resins, more particularly those with iminodiacetate functional groups, after the cation exchange resins have been loaded with metal ions of one or more of the types strongly bound by the resins. Still another object is to provide a method of regenerating cation exchange resins that will substantially reduce or eliminate the introduction of unwanted chemical species into autodeposition baths that are subsequently contacted with the regenerated cation exchange resins. In some embodiments, still another object of the invention is to provide selective removal of one chemical type of cations, usually zinc, from a composition containing at least two chemical types of cations, most often iron and zinc, dissolved therein. In still other embodiments, an object is to displace at least two distinct chemical types of cations from ion exchange resins loaded with these distinct types of cations in relative ratios different from the ratios in which the cations are bound on the ion exchange resin. Other objects will become apparent from the description below.

General Principles of Description

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, unless expressly stated to the contrary: percent, "parts of", and ratio values are by weight; the term "polymer" includes oligomer; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole; and any counterions thus implicitly specified preferably are selected from among other constituents explicitly specified in ionic form, to the extent possible; otherwise such counterions may be freely selected, except for avoiding counterions that act adversely to the objects of the invention.

SUMMARY OF THE INVENTION

It has surprisingly been discovered that when chelating type cation exchange resins are used to remove iron, chromium, and/or zinc cations from used autodeposition baths, especially those in which hydrofluoric acid is the principal source of acidity, there is no need for addition of dispersing agent as taught by Hall to prevent the development of a grainy and/or textured appearance of the objects subsequently coated with the reused baths. More specifically, one preferred embodiment of the invention is a process for forming a smooth coating on a metal surface, said process comprising steps of:

(I) contacting a metal surface selected from the group consisting of ferriferous and zinciferous metal surfaces with an autodeposition composition comprising, preferably consisting essentially of, or still more preferably consisting of, water and:

(A) from 5 to 550, more preferably from 30 to 300, still more preferably from 40 to 120, or most preferably from 40 to 80, g/L of a stably dispersed organic coating resin;

(B) from about 0.4 to about 5, more preferably from 0.5 to 4.0, or still more preferably from 1.0 to 3.0, g/L of fluoride ions;

(C) an amount sufficient to provide from about 0.010 to about 0.20, more preferably from 0.011 to 0.09, or still more preferably from 0.012 to 0.045, oxidizing equivalents per liter of an oxidizing agent selected from the group consisting of dichromate, hydrogen peroxide, ferric ions, and mixtures thereof; and (D) a source of hydrogen ions in an amount sufficient to impart to the autodeposition composition a pH in the range from 1.6 to 3.8, more preferably from 1.7 to 3.0, or still more preferably from 1.8 to 2.5, said contacting being continued for a sufficient time that the metal surface contacted is covered with a film containing the organic coating resin, said film being sufficiently adherent to the metal surface to resist flowing off under the influence of gravity when the coated metal surface is removed from contact with the autodeposition composition, (II) contacting at least 30%, more preferably at least 55%, still more preferably at least 90%, of the total volume of the autodeposition bath from the end of step (I), without adding a dispersing agent selected from the group consisting of cationic and amphoteric surfactants and protective colloids thereto, with a sufficient amount of an acid form chelating cation exchange resin to transfer from the autodeposition bath to the ion exchange resin at least part of the total content of dissolved solved iron, chromium, and zinc cations in the autodeposition bath and substitute an amount equivalent thereto of dissolved hydrogen ions in the autodeposition bath; and (III) contacting the autodeposition bath from the end of step (II) with additional metal surface selected from the group consisting of ferriferous and zinciferous metal surfaces, so as to form on the additional metal surfaces an autodeposited coating that is smooth after drying.

Also surprisingly, it has been discovered that at least zinc and iron cations can be more efficiently removed from iminodiacetate cation exchange resins by relatively dilute sulfuric acid, hydrochloric acid and, most preferably, hydrofluoric acid regenerants, than by more concentrated and/or stronger acid regenerants, when efficiency is measured by the ratio of equivalents of multivalent ions displaced from the loaded ion exchange resin to the equivalents of hydrogen ions present in the volume of regenerant used. More specifically, a second preferred embodiment of the invention is a process comprising steps of:

(I) providing a wet bed of iminodiacetate cation exchange resins, said cation exchange resin having between 0.10 and 0.30 millimoles per milliliter of wet resin bed volume of a total of iron, chromium, and zinc cations bound thereon by exchange from a solution earlier contacted with the cation exchange resin predominantly in its acid form, the volume being measured when the bed of resin in its sodium form has settled to its equilibrium volume under the influence of natural gravity and mild mechanical agitation, in the absence of any flow of liquid through the bed; and the liquid with which the bed is wet is formed by washing the bed with from 0.5 to 4, more preferably with from 1 to 3, total bed volumes of deionized water after the passage of any other liquid through the bed; and (II) adding to the top of the wet bed provided in step (I) a volume of an aqueous acidic regenerant liquid consisting essentially of water and an acid component selected from the group consisting of sulfuric acid, hydrofluoric acid, hydrochloric acid, and mixtures thereof, so as to cause a volume of eluted liquid equal to the volume of regenerant liquid added to flow from the bottom of the wet bed, the volume and composition of the regenerant liquid being selected so that the total volume of eluted liquid contains at least 0.080 millimoles per milliliter of wet resin bed volume of a total of iron, chromium, and zinc cations dissolved therein and the total moles of iron, chromium, and zinc cations displaced from binding to the cation exchange resin into the total volume of eluted liquid is at least equal to 0.070 times the number of equivalents of acid in the total volume of regenerant liquid added to the wet bed.

The description immediately above, and other descriptions below, of processes of using and regenerating a bed of ion exchange resin are based on an assumption that traditional methods of causing liquid to flow through such a bed in one direction only, except for occasional backflushing, would be used. However, it is recognized that some more modern practice involves flowing the liquid containing the ions of major interest to be exchanged, the autodeposition bath in this instance, in one direction through the bed and the regenerant liquid in the opposite direction—a method often denoted by the word "countercurrent". Operation in this manner is also within the intended scope of the invention, and the detailed descriptions herein, with changes in detail having been made in a manner known to those skilled in the art, will also describe such countercurrent operation of a process according to the invention.

In autodeposition baths to be used for coating ferriferous and/or zinciferous surfaces, faces, it is preferred, with increasing preference in the order given, that the baths contain a total of no more than 1, 0.3, 0.1, 0.05, 0.009, or 0.004 g/L of anions other than fluoride and surfactant anions. If any acid other than hydrofluoric acid, or any regenerant composition that contains any substantial amount of anions other than fluoride, is used to regenerate a cation exchange resin used to separate multivalent cations from such autodeposition baths, there is danger of contamination of the bath. Accordingly, a third preferred embodiment of the invention is a process comprising steps of:

(I) contacting a metal surface selected from the group consisting of ferriferous and zinciferous metal surfaces with an autodeposition composition comprising not more than 1 g/L in total of anions other than fluoride and surfactant anions, said contacting being continued for a sufficient time that the metal surface or surfaces contacted are covered with a film containing the organic coating resin, said film being sufficiently adherent to the metal surface to resist flowing off under the influence of gravity when the coated metal surface is removed from contact with the autodeposition composition and forming a smooth coating on the metal surface after drying thereon;

(II) contacting at least 30%, more preferably at least 55%, still more preferably at least 90%, of the total volume of the autodeposition bath from the end of step (I), without adding thereto any dispersing agent selected from the group consisting of cationic and amphoteric surfactants and protective colloids, with a sufficient amount of an acid form cation exchange resin to transfer from the autodeposition bath to the cation exchange resin at least part of the total content of dissolved iron, chromium, and zinc cations in the autodeposition bath and substitute an amount equivalent thereto of dissolved hydrogen ions in the autodeposition bath;

(III) separating the cation exchange resin used in step (II) from the autodeposition bath contacted with said cation exchange resin in step (II);

(IV) contacting the separated cation exchange resin from step (III) with an aqueous acidic liquid consisting essentially of water and hydrofluoric acid in sufficient quantity for a sufficient time to displace at least a part of the multivalent metal ions therefrom and thereby regenerate the exchange capacity of the cation exchange resin; and (V) contacting an autodeposition bath comprising cations selected from the group consisting of iron, chromium, and zinc cations and not more than 1 g/L in total of anions other than fluoride and surfactant anions, without adding thereto any dispersing agent selected from the group consisting of cationic and amphoteric surfactants and protective colloids, with the regenerated acid form cation exchange resin from step (V) for a sufficient time to transfer from the autodeposition bath to the ion exchange resin at least part of the content of dissolved iron, chromium, and zinc cations in the autodeposition bath and substitute an equivalent amount thereto of dissolved hydrogen ions in the autodeposition bath; and, optionally, (VI) contacting the autodeposition bath from the end of step (V) with a metal surface selected from the group consisting of ferriferous and zinciferous metal surfaces for a sufficient time that the metal surface contacted is covered with a film containing the organic coating resin, said film being sufficiently adherent to the metal surface to resist flowing off under the influence of gravity when the coated metal surface is removed from contact with the autodeposition composition and forming a smooth coating on the metal surface after drying thereon.

Still a fourth surprising result is that ion exchange resins having aminophosphonic functional groups, which will complex both iron and zinc ions from autodeposition baths, when regenerated with hydrofluoric acid release substantially only the complexed zinc ions, leaving most or all of the complexed iron ions in place.

A fifth surprising result is that during the passage of autodeposition baths or other aqueous liquid compositions containing both iron and zinc ions through ion exchange resins with aminophosphonic, thiol, or sulfonic acid functional groups, the zinc ions are so much more strongly bound that zinc ions can displace already complexed iron ions, a phenomenon known as "roll-over". Ion exchange resins having aminophosphonic or sulfonic acid or thiol functional groups thus can provide selective removal of zinc from baths containing both iron and zinc, while the iron can be removed by subsequent treatment with another type of ion exchange resin such as iminodiacetate. Forming autodeposited coatings on galvanized steel substrates releases both iron and zinc ions into the autodeposition baths, and the zinc ions are even more destabilizing to the baths than the iron ions. Therefore selective removal of zinc is particularly valuable for maintaining autodeposition baths used to coat galvanized steel, an application area for autodeposition that heretofore has generally not been practical because of rapid destabilization of the autodeposition baths.

The combination of these discoveries permits very efficient and economical recycling of autodeposition baths.

BRIEF DESCRIPTION OF THE DRAWINGS

In FIG. 1 there are three graphs that correspond to use of a 0.25 N, 1.00 N and 5.2 N hydrofluoric acid. Similarly in FIG. 2 and FIG. 3, the regenerant acid compositions were 0.25 N, 1.00 N and 5.2 N sulfuric acid and 0.25 N, 1.00 N and 5.2 N hydrochloric acid respectively. The use of 5.2 N acid composition is representative of the prior art.

DESCRIPTION OF PREFERRED EMBODIMENTS

Figure 1:
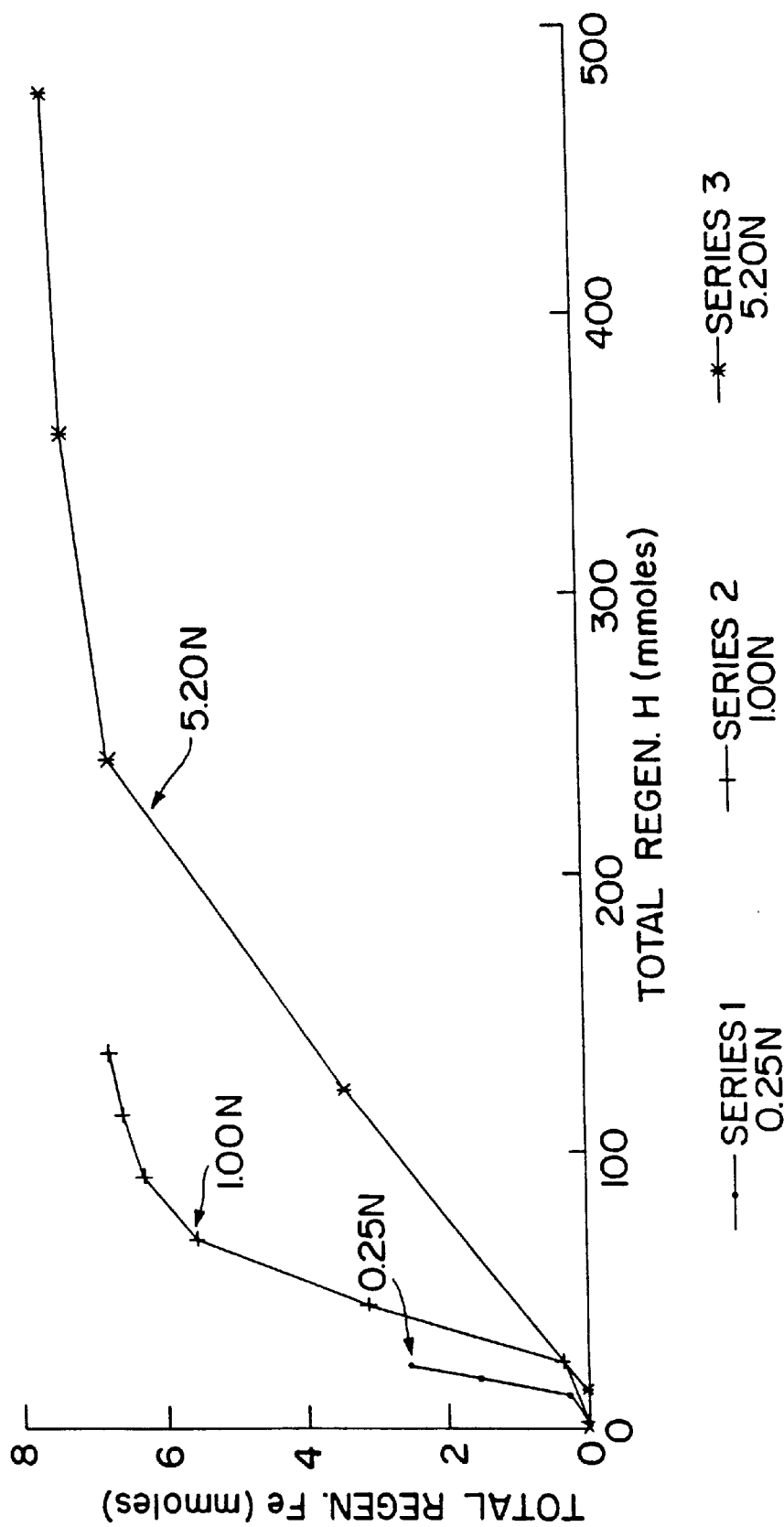
FIGS. 1–3 describe graphically the treatment of a fixed volume of a cationic exchange resin saturated with iron with increasing volumes of a specified regenerant acid composition.

The preferred type of ion exchange resin for use with this invention, when iron is the primary metal ion to be removed as is generally the case in treating baths used for coating steel, is one having iminodiacetate functional groups. Suitable commercial examples include AMBERLITE® IRC-718, described by its supplier as having a "macroreticular" structure; LEWATIT™ TP-207, described by its supplier, Miles, Inc., as "macroporous"; and PUROLITE™ S-930, also described as "macroporous" by its supplier, Purolite Company. It is expected that other products of the same type would be equally satisfactory.

For removal of zinc ions, particularly for the selective removal of zinc ions from autodeposition baths containing both iron and zinc ions, the most preferred type of ion exchange resin is a "gel" type of resin with sulfonic acid functional groups attached to some of the phenyl rings in a styrene-divinyl benzene copolymer resin matrix. The mole percent of divinyl benzene residues in the mixture of divinyl benzene residues and styrene residues that constitute the part of the ion exchange resin other than the sulfonic acid functional groups is also known as the percent of cross linking of the resin, because the divinyl benzene residues in the polymer link two otherwise linear polystyrene chains. The percent of cross linking for resins of this type to be used in this invention preferably is, with increasing preference in the order given, at least 2, 4, 6, 8, 9, or 10 and independently preferably is, with increasing preference in the order given, not more than 25, 20, 18, 16, 14, 12, or 11. Suitable commercial examples of the most preferred type of resin include AMBERLITE® IR-122 from Rohm & Haas Co. and DIAION™ SK 110 from Mitsubishi Kasei. It is expected that other products of the same type would be equally satisfactory.

Cation exchange resins such as those described above are commonly supplied in the sodium form. Before using them in a process according to this invention for extracting multivalent metal ions from autodeposition baths, it is highly preferred to convert them into the acid form, in order to avoid the generally undesired introduction of sodium ions into the baths. This conversion to the acid form may be accomplished by means known per se in the art, for example by treatment with any adequately strong acid.

After conversion to the acid form, it is preferred to rinse the acid form resin with water, preferably deionized, distilled, or otherwise purified water, before using it for extracting multivalent metal ions from an autodeposition bath, even if the acid used to put the ion exchange resin into the acid form is the same as the one used in the autodeposition composition to be treated with the bath. The reason for this preference is that experience has shown that the amount of acid remaining in contact with a wet bed of acid form ion exchange resin, when practical concentrations of aqueous acid are used to put the ion exchange resin into acid form, is usually in excess of the amount needed to regenerate the autodeposition composition to be contacted with the acid form ion exchange resin for removal of multivalent metal ions. Therefore, if there is no rinsing before using the acid form ion exchange resin, more acid than is needed will be introduced into the autodeposition composition, so that it will eventually become unsuitable for use for that reason.

It is also preferred to use the same acid(s) as used in the autodeposition composition sition to be treated for converting the ion exchange resin to acid form, or for regenerating it after use, in order to avoid introduction into the autodeposition bath of any substantial amounts of anions other than those originally present in the autodeposition bath.

As with other uses of ion exchange resins, it is generally preferred with this invention to use the ion exchange resins in the form of a bed formed by settling of the beads or particles of resin as supplied by the manufacturer into a container with sidewalls impervious to liquids but a bottom at least partially pervious to liquids. Gentle tapping or vibration of the container is generally used to help the formation of a desirably compact bed of the ion exchange resin. Liquids, such as the autodeposition composition, that contain cations to be removed are passed through such beds until some desired fraction of the capacity of the resin for the ions to be removed is reached. A regenerant acid liquid is then passed through the bed, and after enough of the multivalent metal cations have been displaced, the ion exchange resin bed is ready for use again to remove multivalent metal ions. Ordinarily it is preferred to rinse the bed of ion exchange resin with water, preferably with deionized, distilled, or other purified water, between each of these stages of use of the bed. The rinses and effluents from the various stages may advantageously be at least partially recycled for use in a manner known per se, and some cases it may be possible to eliminate some of the intermediate rinses by control of the concentrations of regenerants and other liquid compositions used, for example, so that the amount of acid remaining in equilibrium with the ion exchange resin after regenerating the resin corresponds sufficiently closely to the amount needed to replenish the autodeposition bath.

The total volume of cation exchange resin used in a process according to this invention is measured when needed by allowing the resin particles in their sodium form, wet with a suitable liquid, to settle into a bed in a container under the influence of natural gravity and gentle tapping or vibration of the container, and then discontinuing any net flow of liquid through the bed. The minimum bulk container volume required to contain the amount of ion exchange resin used under such conditions is taken as the volume of the ion exchange resin for purposes of any quantitative descriptions of the volume of ion exchange resin herein.

The conditions and compositions used for coating metal substrates by autodeposition in a process according to this invention are generally those already known in the art. Specific preferred conditions are described below.

One preferred type of coating resin for use in forming autodeposited coatings in a process according to the present invention comprise internally stabilized vinylidene chloride copolymers or externally stabilized vinylidene chloride copolymers containing in excess of 50%, or more preferably at least 80%, of residues from polymerizing vinylidene chloride. Most preferably, the vinylidene chloride copolymer is crystalline in nature. Exemplary crystalline resins are described in U.S. Pat. Nos. 3,922,451 and 3,617,368. Generally speaking, crystalline poly{vinylidene chloride} containing resins comprise a relatively high proportion of residues from vinylidene chloride, for example, at least about 80% by weight thereof.

A preferred working autodepositing bath containing a commercially available poly{vinylidene chloride} resin has the following composition, designated Bath Composition I:

| Ingredient | Amount (in g/L, 100% Active Ingredients Basis) |
| --- | --- |
| Vinylidene chloride-acrylonitrile-butyl acrylate copolymer latex | 50.00 |
| Dodecyl diphenyloxide disulfonate surfactant | 0.14 |
| Colloidal carbon black pigment | 1.88 |
| Ferric fluoride | 3.00 |
| Hydrofluoric acid | 1.40 |
| Deionized water | balance to make one liter of bath. |

Examples of latexes for suitable use in this composition are commercially available and include the SERFENE® latexes available from Morton Chemical, DARAN® 112 and DARAN® SL 143 available from W. R. Grace, 76 RES 5517 available from Unocal and the HALOFLEX® latexes such as, for example, HALOFLEX® 202 available from Imperial Chemicals Industries. Examples of colloidal carbon black pigment dispersions suitable for use in the composition include RAVEN BLACK® 1035 available from Columbian Chemicals Co., T-2166A available from ABCO Enterprises, Inc., AQUABLACK® 255 and AQUABLACK® 115A available from Borden Chemical Co.

A second preferred type of resin for use in autodeposition coating in connection with this invention is the acrylic type, particularly copolymers of acrylonitrile. A preferred working autodepositing bath containing a commercially available acrylic resin has the following composition, designated Bath Composition II:

| Ingredient | Amount (in g/L, 100% Active Ingredients Basis) |
| --- | --- |
| Acrylic resin latex | 58.00 |
| Dodecyl diphenyloxide disulfonate surfactant | 0.14 |
| TEXANOL ™ | 12.20 |
| Colloidal carbon black pigment | 1.88 |
| Ferric fluoride | 3.00 |
| Hydrofluoric acid | 1.40 |
| Deionized water | balance to make one liter of bath. |

Examples of commercially available latexes for suitable use in this composition include NACRYLIC® 78-6334 and NACRYLIC® 78-6408 from National Starch Co.; NEOACRYL® A-640 from Imperial Chemicals Industries; RHOPLEX® WL-91 and RHOPLEX® B-85 from Rohm and Haas Co.; 76 RES 1018 from Unocal. Examples of colloidal carbon black are the same as those listed above. TEXANOL™ is available from Eastman Chemical Products, Inc. and is reported by its supplier to consist substantially of 2,2,4-trimethyl-1,3-pentanediol monoisobutyrate.

Preferably the concentration of dissolved iron, which is usually in the ferric form in autodeposition compositions of the preferred type, should not be allowed to become greater than 4, or, with increasing preference in the order given, not greater than 2.0, 1.9, 1.8, 1.7, 1.6, or 1.5 g/L during the operation of a process according to this invention; independently, with increasing preference in the order given, the concentration of dissolved zinc cations should not be allowed to become greater than 3, 2, 1.5, 1.0, 0.9, 0.8, 0.70, 0.60, 0.50, 0.40, 0.35, 0.30, 0.27, 0.25, 0.23, 0.21, 0.19, 0.18, 0.17, or 0.16 g/L during the operation of a process according to this invention; and independently, with increasing preference in the order given, the concentration of dissolved chromium cations should not be allowed to become greater than 3, 2, 1.5, 1.0, 0.9, 0.8, 0.70, 0.60, 0.50, 0.40, 0.35, 0.30, 0.27, 0.25, 0.23, 0.21, 0.19, 0.18, 0.17, or 0.16 g/L during the operation of a process according to this invention. Maintenance of dissolved multivalent cation levels below their desired limits can be assured by contacting the entire autodeposition composition, or usually more conveniently a part of it within a given time interval, with an acid form cation exchange resin and then returning the thus "purified" autodeposition composition for use in coating additional metal surfaces. Means of accomplishing such purification processes batchwise or continuously are generally known in the art and will not be considered in detail here; details of preferred automated purification processes are given in the disclosure of U.S. Pat. No. 5,393,416 of Feb. 28, 1995 to Kozak et al., the entire disclosure of which is hereby incorporated herein by reference. Instead, the focus will be on a major point of operational novelty of the present processes, the use and regeneration of cation ion exchange resins, preferably those of the highly preferred iminodiacetate type (for selectively removing iron) or styrene-divinyl benzene copolymer gel type with sulfonic acid functional groups (for selectively removing zinc).

When any fixed volume of a cation exchange resin is contacted with increasing volumes of a specified liquid composition containing exchangeable cations, the volume of cation exchange resin will eventually become saturated with the exchangeable ions and will no longer remove any such ions from any additional volume of the specified liquid composition until the ion exchange resin is regenerated by contact with a regenerant liquid containing ions of a different type from those exchanged with the first specified liquid composition. The amount of cations per unit volume of resin present after such saturation of the ion exchange resin is generally known in the art as the "saturation capacity" of the resin, in contrast to a "working capacity" that depends on how an actual process is operated. The saturation capacity is often assumed, particularly when dealing with relatively simple solutions such as natural waters to be softened or otherwise purified, to be independent of the composition used to load the resin. In fact, however, the saturation capacity of an ion exchange resin for a particular type or mixture of types of cations often depends on the liquid composition used to load it with these cations. In connection with this process, it is particularly important to note that the capacity values specified below must be defined in connection with the autodeposition composition used with the exchange resin, as it has been found that the actual capacities of the ion exchange resins for iron and zinc in particular, when the capacity is determined with actual used or simulated used autodeposition compositions, can be substantially lower than the nominal values given by manufacturers of the ion exchange resins, these manufacturers' values being normally based on sodium exchange. The saturation capacity of iminodiacetate resins in particular is very sensitive to the pH of the solutions used to load the resins with multivalent ions.

When the ion exchange resin used in a process according to this invention has been loaded to a point within the range of from 50–99, more preferably from 75–95, or still more preferably from 75 to 90, percent of its saturation capacity for the ions that are desired to be removed from the autodeposition compositions used in the same process according to the invention, the ion exchange resin is ready for the regeneration step of the process. Alternatively, when compositions and other operating parameters have been sufficiently reliably established by experience with particular autodeposition compositions and loads of substrate surfaces to be coated, and the ion exchange resin is used in a bed as described above, regeneration can be based on the number of bed volumes of used autodeposition composition passed through the bed of ion exchange resin.

The practice of the invention may be further appreciated from the following working examples.

EXAMPLES AND COMPARISON EXAMPLES
GROUP 1

The following laboratory tests were carried out in an attempt to determine the optimum conditions for regeneration. A large sample of AMBERLITE® IRC-718 cation exchange resin was saturated with iron by passing through it 10 bed volumes of a simulated used autodeposition composition having the same ingredients as Bath Composition I already given above, except that the amount of ferric fluoride was increased to give a concentration of 2 g/L of iron cations. The resin thus loaded was then rinsed with deionized water until the effluent was free of visible latex. The solution in the wet bed was sampled and found to contain 0.060 g/L of iron. The resin contained 0.13 millimoles of iron per milliliter (hereinafter abbreviated "ml") of resin, as measured by the maximum amount that could be eluted with any of the acids described below.

Samples of 60–61 ml of this loaded and rinsed resin were then placed in a conventional lab container for ion exchange resins to give a bed depth of 45 centimeters and subjected to successive elution with six successive increments, of 20 ml volume per increment, of the nine specified regenerant acid compositions as follows: 0.25, 1.0, and 5.20 N aqueous solutions of each of sulfuric, hydrochloric, and hydrofluoric acids. (In calculating the normalities, sulfuric acid was assumed to ionize both protons completely and hydrofluoric and hydrochloric acids to ionize their protons completely.)

The effluents from the columns after each such increment were collected and analyzed for iron content by atomic absorption spectroscopy. To accurately determine quantitatively the amount of iron ions stripped from the resin relative to the amount of regenerant acid which was fed to the column, the liquid retention characteristics of the column first needed to be determined. To do this, the column was loaded with resin in the sodium form and filled with deionized water. A 1.0 N aqueous NaCl solution was then pumped in downflow through the column. Successive 20 ml samples of the column effluent were then collected and analyzed for sodium ion concentration. Because no ion exchange occurs during this process, the concentration of sodium in the effluent can be used to determine how the regenerant wave front is affected simply by replacing the distilled water with which the bed was originally wet and any other water present in the particular pump, lines, valves, and column between the point of addition of regenerant and the sampling point used for effluent.

The sodium ion normalities of the first four 20 ml samples in the test described immediately above were 0.00, 0.12, 0.94, and 1.00 respectively. The fraction of effluent derived from the regenerant was thereby determined to be 0.0 for the first 20 ml increment of effluent after beginning regeneration, 0.12 for the second increment, 0.94 for the third increment, and 1.0 for all subsequent increments.

These values were then used in calculating the efficiency of the added hydrogen ions in displacing the ferric ions bound on the ion exchange resin as follows: The first 20 ml increment of effluent was disregarded for the efficiency calculations, because no iron would be expected in it, and occasional checks confirmed that there was none. The amount of iron in the remaining increments was determined analytically and converted to a cumulated total number of millimoles of iron. By analogy with the results for the tests with sodium form ion exchange resin and sodium chloride solutions, the cumulated number of millimoles of hydrogen that had been available for regeneration of the ion exchange resin, instead of merely displacing water from the ion exchange column, was calculated as 12% of the hydrogen ions in the second increment of regenerant acid, 94% of the hydrogen ions in the third increment of regenerant acid, and 100% of the hydrogen ions present in all the remaining increments of regenerating acid.

Figure 2:
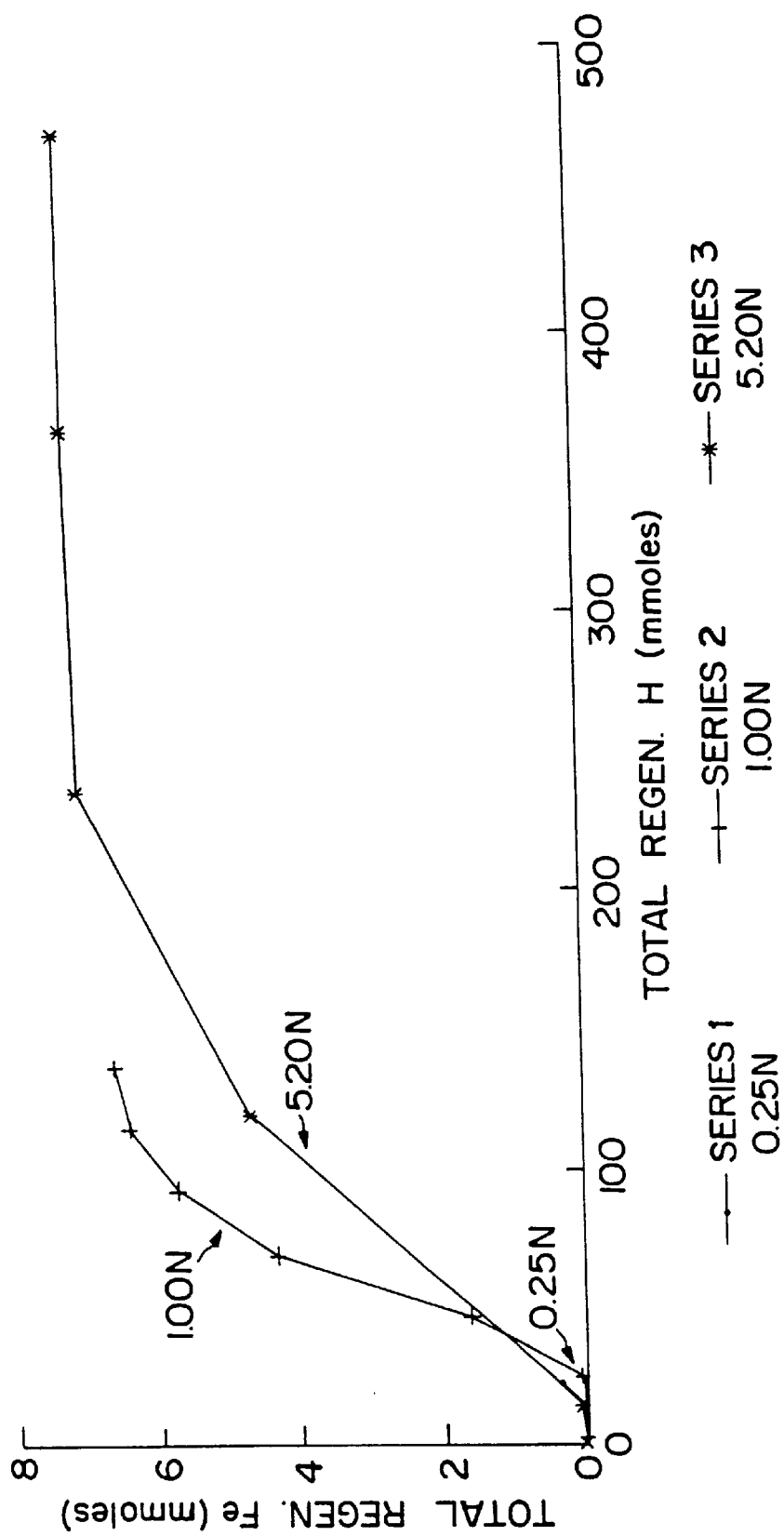
Figure 3:
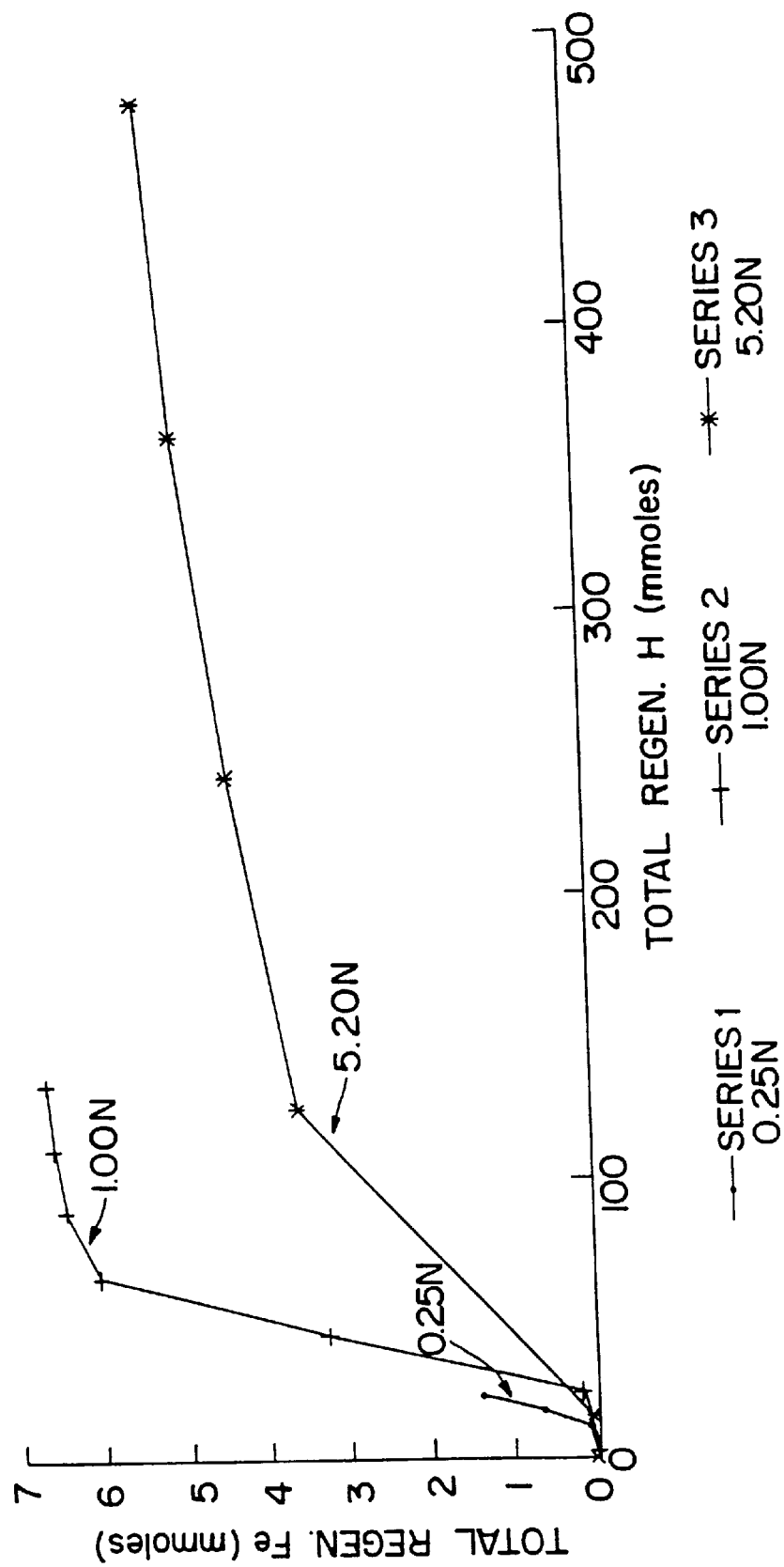

The cumulated amounts of regenerated iron determined as above after each increment of regenerant were plotted against the cumulated number of millimoles of acid in the amount of regenerant used to produce FIG. 1 for hydrofluoric acid, FIG. 2 for sulfuric acid, and FIG. 3 for hydrochloric acid. Certain features of these Figures are illustrated in Table 1. The Figures and the data in Table 1 show that, contrary to normal expectations from prior art ion exchange resin regeneration, the regeneration is more efficient with either 0.25 or 1 N acids than with the same acids at 5.2 N, and it is thus preferred that the regenerating acid not be more concentrated than 2.0 N. Also, contrary to expectations and the teachings of the most closely related known prior art for regeneration of ion exchange resins to their acid form, hydrochloric and hydrofluoric acids can be, and at relatively low concentrations are, more efficient than sulfuric acid, even though hydrofluoric acid is known not to be nearly as "strong" an acid as sulfuric or hydrochloric because of its lower ionization constant.

As already noted above, it is preferred to formulate the autodeposition composition in most cases with hydrofluoric acid as the only acid constituent, and in such cases, it is preferred to use hydrofluoric acid as the regenerant, in a concentration of from 0.5 to 3%, or more preferably from 1–2.5%. (For comparison, 1 NHF is very close to 2% by weight.)

EXAMPLE GROUP 2

In each of the tests in this group, a bed of 60–61 ml of LEWATIT™ TP-207, PUROLITE™ S-940, or AMBER-LITE® 200 sodium form cation exchange resin was loaded into a 45 centimeter deep bed, and then subjected to the following steps:
1. Convert to acid form with 500 ml of 17% aqueous sulfuric acid passed through the bed.
2. Rinse with 500 ml of deionized water.
3. Rinse with 200 ml of 5% aqueous hydrofluoric acid.
4. Rinse with 250 ml of deionized water.

TABLE 1

| Regenerant Composition | Ratio of Millimoles of Iron Regenerated to Milliequivalents of Acid in Regenerant Volume Used |
| --- | --- |
| After 1 Millimole of Iron Total Has Been Eluted | |
| 5.2N $H_2SO_4$ | 0.026 |
| 5.2N HCl | 0.021 |
| 5.2N HF | 0.021 |
| 1.0N $H_2SO_4$ | 0.026 |
| 1.0N HCl | 0.036 |
| 1.0N HF | 0.036 |
| 0.25N $H_2SO_4$ | <0.03* |
| 0.25N HCl | 0.051 |
| 0.25N HF | 0.065 |
| After 5 Millimoles of Iron Total Has Been Eluted | |
| 5.2N $H_2SO_4$ | 0.036 |
| 5.2N HCl | 0.012 |
| 5.2N HF | 0.028 |
| 1.0N $H_2SO_4$ | 0.062 |
| 1.0N HCl | 0.086 |
| 1.0N HF | 0.079 |

*Value extrapolated from actual data.

5. Load by flowing through about 900 ml of an autodeposition composition that was the same as Bath Composition I described above except that it also contains sufficient dissolved zinc fluoride to produce a concentration of 0.3 g/L of zinc cations, or alternatively with Bath Composition I itself.
6. Rinse with 2 bed volumes of deionized water.
7. Regenerate with 3 bed volumes of 1% or 10% aqueous hydrofluoric acid or with 2 or 20% aqueous sulfuric acid.
8. Rinse with 2 bed volumes of DI water.
The effluents from the ion exchange resin bed were analyzed to determine the amounts of iron and zinc retained on the ion exchange resin and subsequently eluted. Some results obtained with the autodepositing composition containing zinc and with 10% hydrofluoric acid regenerant are shown in Table 2.

TABLE 2

| Ion Exchange Resin Type | Percent of Metal in the Autodeposition Bath Bound to the Ion Exchange Resin for: | | Milligrams per Milliliter of Ion Exchange Resin of Bound: | | Percent of Resin-Bound Metal Removed by Acid Regenerant | |
| --- | --- | --- | --- | --- | --- | --- |
| | Fe | Zn | Fe | Zn | Fe | Zn |
| TP-207 | 44 | 78 | 9.9 | 3.8 | 88 | 99+ |
| S-940 | 38 | 73 | 7.3 | 3.2 | 15 | 97 |
| AMBERLITE ® 200 | 98 | 99+ | 26.7 | 5.7 | 81 | 1 |

Notes for Table 2
S-940 Resin has phosphonic acid functional groups; AMBERLITE ® 200 has strong (sulfonic acid) functional groups.

The data in Table 2 show that sulfonic acid type resins are most efficient in binding both iron and zinc, but are relatively difficult to regenerate with hydrofluoric acid, especially for zinc. The phosphonic acid resins are very hard to regenerate from bound iron with 10% hydrofluoric acid.

When Bath Composition I (without zinc) was used, along with both dilute and concentrated hydrofluoric and sulfuric acids and the AMBERLITE® 200 sulfonic acid type resin, the results were notably different. With 10% HF, about 71% of the bound iron was eluted with 2 bed volumes of acid, while with 20% sulfuric acid, about 68% of the bound iron was eluted with the same volume of acid regenerant. With 2 bed volumes of 1% HF regenerant, over 90% of the bound iron was eluted, even though this regenerant contained only one-tenth as many protons as the 10% HF which eluted less. On the other hand, when 2% $H_2SO_4$ was the regenerant, only about 35% of the bound iron was eluted with 2 bed volumes of regenerant. Thus, with strong acid cation exchange resins as well as the chelating weak acid ones, hydrofluoric acid can be more effective than a strong acid such as sulfuric in eluting the bound iron.

EXAMPLES GROUP 3

A volume of 19 liters of an autodeposition bath having the same composition as Bath Composition I as defined above, except that the amount of ferric fluoride was increased to give an iron cation concentration of 2.2 g/L, was prepared and passed through a bed with a volume of 1.9 liters of AMBERLITE® IRC-718, iminodiacetate cation exchange resin, in its acid form, so as to reduce the concentration of iron in the autodeposition bath to 1.7 g/L. The autodeposition composition that had passed through the cation exchange resin was then used to coat several test panels that aggregated to about 1 square meter of total steel surface. The ion exchange resin was rinsed with 0.8 bed volumes of deionized $H_2O$, regenerated with 1.5 bed volumes of 10% BF, rinsed with 1.6 bed volumes of deionized $H_2O$, and backflushed with deionized $H_2O$ at 4.9 meter/hr. for 10 minutes. The above sequence of steps was repeated ten times with the same cation exchange resin, thereby demonstrating that the exchange capacity of the resin did not diminish with this amount of use which amounted to passage of 100 bed volumes of autodeposition bath through the ion exchange bed. After each repetition, the quality of coating produced was evaluated by conventional salt spray and scab corrosion tests, and the surface quality produced was visually evaluated. There was no deterioration in the corrosion test results after any of the ten repetitions, and no development of grainy or textured surface such as reported under similar conditions of iron removal in U.S. Pat. No. 3,839,097.

EXAMPLES GROUP 4

This example group illustrates general principles and a specific example of an integrated process of the invention that enables substantial reductions in the waste of material as compared with currently conventional autodeposition processes.

Figure 4:
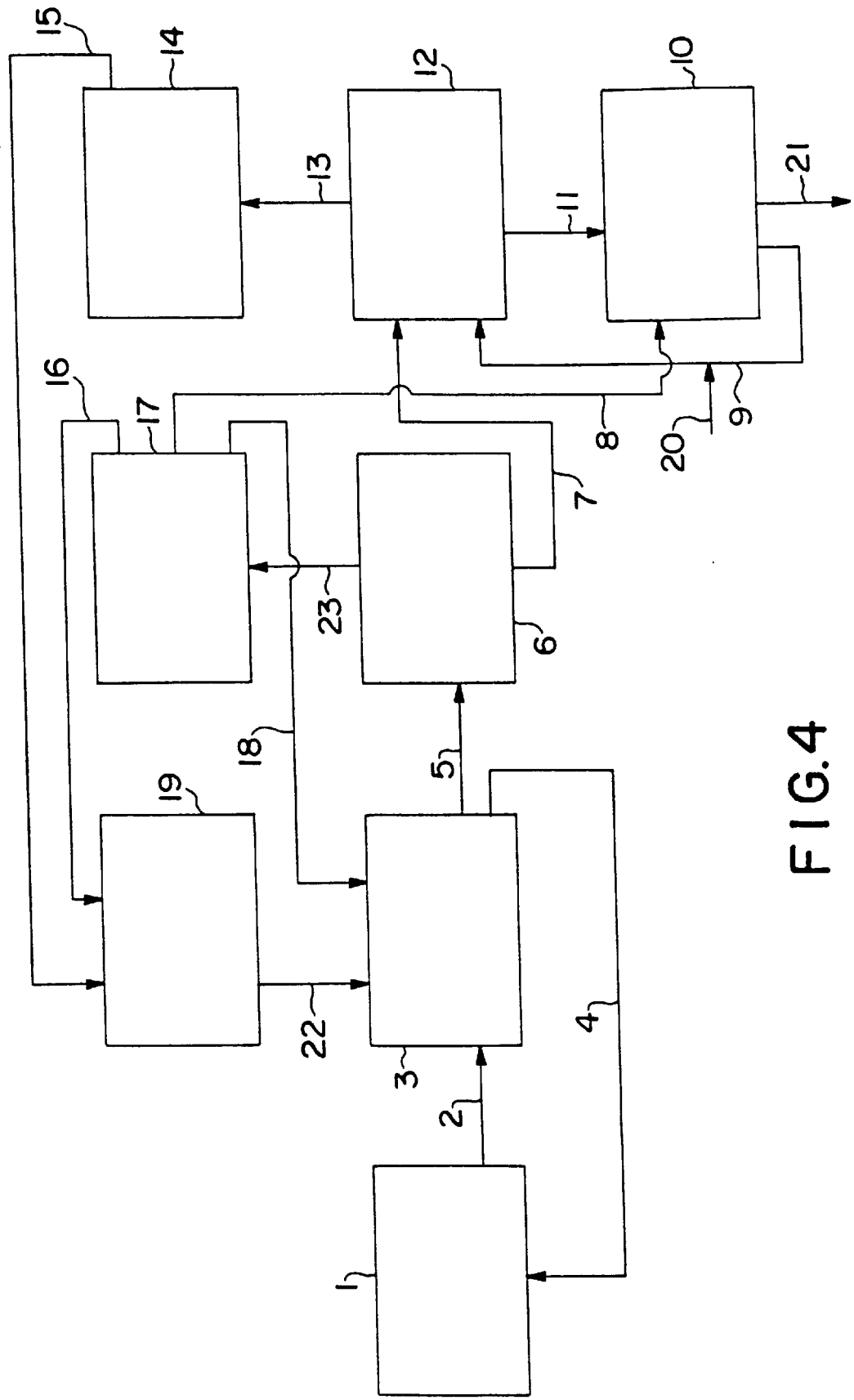
FIG. 4 illustrates one preferred embodiment of the invention which maximizes recycling and thereby minimizes waste materials used in the autodeposition process.

The process is illustrated in FIG. 4. An autodeposition bath utilizing hydrofluoric acid as its only acid component, such as one of the compositions described above, is used in autodeposition bath container 1 in the figure to deposit a suitable coating on steel parts, thereby introducing dissolved iron into the autodeposition bath. A small fraction per hour, such as 0.5 to 5% per hour, of the total content of the autodeposition bath is continuously withdrawn during operation of the process from container 1 through pipe 2 and introduced to a bed of wet ion exchange resin in its acid form in exchange vessel 3. At first, the liquid displaced from the wet ion exchange resin is substantially water and is directed through pipe 5. However, after about 0.4–0.5 bed volumes of autodeposition bath have been introduced to the top of the wet ion exchange resin in its acid form, liquid with a composition sufficiently similar in composition to the original autodeposition bath, before any iron contamination, to be suitable for return to container 1 emerges from the bottom of the ion exchange bed and is directed through pipe 4 back to container 1 in which the autodeposition process occurs.

When the ion exchange resin in vessel 3 has become sufficiently loaded with iron that it can no longer achieve the desired degree of iron removal, as occurs in one application of practical interest after about 10.7 bed volumes of used autodeposition bath have passed through the ion exchange bed, the flow of autodeposition bath through pipe 2 is temporarily suspended by use of valves not shown. Deionized water is then added to vessel 3 from water reservoir 17 through pipe 18, thereby displacing additional autodeposition bath from the ion exchange resin in vessel 3 through pipe 4 to container 1, where it serves to replenish part of the resin lost by coating and water lost by evaporation from container 1. When the concentration of useful autodeposition bath components in the flow from the bottom of the ion exchange resin bed becomes too dilute to return to container 1 without diluting the composition in that container below its desired value, a result which occurs in the same application as noted above after about 0.4 bed volumes of water have been used, the flow from the bottom of the ion exchange resin bed through pipe 4 is suspended.

If the water supply is plentiful, additional water rinsing is normally continued at this point to maximize the efficiency of regeneration of the ion exchange resin to its acid form, with the flow from the bottom of the ion exchange resin bed being directed through pipe 5; in the particular application being illustrated here, about 2.2 bed volumes are used for this purpose. (Alternatively, slightly more acid regenerant could be used in the next stage of operations.)

When the desired amount of water has been applied as described above to displace the resin content of the autodeposition bath in vessel 3, the outlet to pipe 4 is closed if it is not already closed and the outlet to pipe 5 opened if it is not already open, and aqueous hydrofluoric acid, in the specific example at a concentration of 2.0%, is introduced through pipe 22 from diluter 19 into vessel 3 containing the iron loaded ion exchange resin. When sufficient regenerating acid has passed through the ion exchange resin bed, in the specific example after about 0.8 bed volumes of this regenerating acid, the input is changed to deionized water until a sufficient restoration of the ion exchange resin bed to its wet acid form without excess acid present in the wetting liquid for the resin bed has been achieved; in the specific example, about 2.6 bed volumes are used for this purpose.

The various liquid compositions noted above as directed from vessel 3 through pipe 5 flow into distillation column 6. In the specific example, the resulting aggregated and mixed stream contains about 0.1% HF and 0.3% $FeF_3$, with the balance water. Water vapor from the top of column 6 is collected and condensed and added to the content of reservoir 17, while a water-HF azeotrope containing dissolved $FeF_3$ is removed from the bottom of column 6 through pipe 7 to reactor-distillation column 12, to which concentrated sulfuric acid is added, via input pipe 20 into pipe 9, in sufficient quantity to convert the ferric fluoride content to hydrofluoric acid and ferric sulfate. As solution containing ferric fluoride moves from the outlet of pipe 7 down through reactor-distillation column 12, it reacts with the sulfuric acid to produce ferric sulfate, which has only slight solubility in the concentrated aqueous sulfuric acid solution that exists at the bottom of column 12. Water-hydrofluoric acid azeotrope thus distills from the top of column 12 to reservoir 14, while the bottoms from column 12, consisting of a suspension of ferric sulfate in concentrated sulfuric acid, are led through pipe 11 to filter 10, where the ferric sulfate is removed by filtration, washed with water delivered through pipe 8 from reservoir 17 if desired, to displace acid from the filter cake, and the filter cake is discarded through outlet 21 to waste. The azeotropic hydrofluoric acid from reservoir 14 is led through pipe 15 to diluter 19, where it is mixed with additional water from reservoir 17, added through pipe 16, to produce the aqueous hydrofluoric acid needed for delivery through pipe 22. Wash liquid from the filter is recirculated through pipe 9 to the reactor-distillation column 12, with new additions of sulfuric acid via pipe 20 as needed.

After regeneration is complete, the flow of autodeposition bath through column 3 can be restarted. If desired, all components of FIG. 4 except container 1 can be duplicated, so that the purification of the autodeposition bath can be carried out without interruption; when one ion exchange column is loaded, the flow of autodeposition bath is switched to the alternate one, while the first is being regenerated.

By this method, only the relatively small amounts of iron dissolved from the parts being coated and the amount of sulfuric acid required to convert this iron to ferric sulfate is generally wasted. Except for mechanical losses, no hydrofluoric acid need be wasted, either as such or in the form of ferric fluoride, and the coating resin not actually used to form the autodeposited coating is also recycled. No more than 0.1% per day of the resin not actually coated during continuous operation according to this method needs to be replaced, in contrast to over 30% per day in operations without removal of dissolved iron by ion exchange as described herein.

EXAMPLES AND COMPARISON EXAMPLES GROUP 5

The main purpose of this group of examples was to demonstrate selective removal of zinc from autodeposition compositions containing both iron and zinc. At least three factors have been found to have an important influence on the overall selectivity for zinc: (1) the inherent selectivity of binding to the resin, as determined from simple batch equilibrium studies; (2) the ability of a resin to "roll-over", i.e., to have zinc cations displace iron cations already bound to the resin; and (3) the type and concentration of acid used for regeneration. This example group provides data on how these three factors impact the overall separation selectivity for zinc, "S", which is defined as follows:

$$S=[(Zn_r/Fe_r)/(Zn_s/Fe_s)]$$

where the subscript "r" indicates the concentration of the noted element bound to the ion exchange resin and the subscript "s" the concentration remaining in solution.

Twelve commercially available ion-exchange resins, as shown in Table 3 below, were first screened in a batch equilibrium study to determine their selectivity between iron and zinc from a simple water solution of 1321 ppm of ferric ions and 321 ppm of zinc ions, both added as fluorides. In the screening tests, 5 ml samples of wet, water-washed ion exchange resin in acid form were mixed with 100 ml of the iron and zinc containing solution noted. The mixture was agitated twice initially, allowing the ion exchange resin to settle after each agitation, then was agitated again once each hour for 3 hours, then allowed to sit for 15 hours. The supernatant liquid in each mixture was then decanted and analyzed by atomic absorption ("AA") spectroscopy for iron and zinc. From the concentrations of these two metals measured in the decanted liquids, the ratio amount of bound zinc and iron on the ion exchange resin was determined by dividing the difference between the zinc concentrations of the feed and of the decanted solutions after

TABLE 3

CHARACTERISTICS OF
ION EXCHANGE RESINS USED IN GROUP 5

| Tradename of Resin | Manufacturer of Resin | Type of Functional Groups in Resin |
|---|---|---|
| AMBERLITE IRC-718 | Rohm & Haas Company | iminodiacetate |
| LEWATIT TP-207 | Bayer AG/Miles Inc. | iminodiacetate |
| AMBERLITE DP-1 | Rohm & Haas Company | carboxylic acid |
| AMBERLITE 200 | Rohm & Haas Company | sulfonic acid |
| BIO-REX MSZ 50 | Bio-Rad Laboratories | sulfonic acid |
| PUROLITE C-100X10 | The Purolite Company | sulfonic acid |
| DUOLITE C-467 | Rohm & Haas Company | aminophosphonic |
| PUROLITE S-940 | The Purolite Company | aminophosphonic |
| DUOLITE CS-100 | Rohm & Haas Company | phenol-formaldehyde |
| DUOLITE GT-73 | Rohm & Haas Company | thiol |
| AMBERLITE IRA-743 | Rohm & Haas Company | N-methyl glucamine |
| DIPHONIX | Eichrome Industries, Inc. | Diphosphonic acid | equilibration with the ion exchange resin by the difference between the iron concentrations for the same solutions. From this ratio and the directly measured concentrations of iron and zinc in the decanted solutions after equilibration, the selectivity for zinc was calculated as described above. The results are shown in Table 4. (The values listed in Table 4 for the zinc and iron concentrations on the resin are actually the concentration differences between the concentrations in the feed solution and in the decanted solutions after equilibration with the ion exchange resin. Because the exact actual volume of the resin is not known, the concentrations are in arbitrary units, but only the ratio of these concentrations, which will be the same irrespective of their units if the units are the same for each element, is required to calculate the selectivity as defined above.) It should be noted that the selectivities listed in Table 4 are based only on the loading stage. Other

TABLE 4

SELECTIVITY AND RELATED DATA, GROUP 5

| Ion Exchange Resin | Supernatant Solution Concentration, ppm of: | | Concentration Bound on Resin, Arbitrary Units of: | | Selectivity for Zinc |
|---|---|---|---|---|---|
| | Fe | Zn | Fe | Zn | |
| AMBERLITE IRC-718 | 810 | 228 | 510 | 93 | 0.64 |
| LEWATIT TP-207 | 715 | 157 | 605 | 164 | 1.23 |
| AMBERLITE DP-1 | 1285 | 313 | 35 | 8 | 0.96 |
| AMBERLITE 200 | 385 | 3.1 | 935 | 318 | 42 |
| BIO-REX MSZ 50 | 200 | 2.2 | 1120 | 319 | 25 |
| PUROLITE C-100X10 | 277 | 2.2 | 1043 | 319 | 39 |
| DUOLITE C-467 | 1100 | 136 | 220 | 185 | 7.0 |
| PUROLITE S-940 | 1140 | 151 | 180 | 170 | 7.2 |
| DUOLITE CS-100 | 1340 | 287 | −20 | 34 | −8.10 |
| DUOLITE GT-73 | 1285 | 216 | 35 | 105 | 17.6 |
| AMBERLITE IRA-743 | 1290 | 286 | 30 | 35 | 5.3 |
| DIPHONIX | 400 | 33 | 920 | 288 | 3.7 | data already set forth above, for example in Table 2, clearly show that additional selectivity in favor of either iron or zinc can be achieved if desired during the regeneration stage.

One example of each of the sulfonic acid, thiol, and aminophosphonic acid types of resins, which were shown to be most selective according to the results of the batch equilibrium experiments summarized in Table 4, were then tested in column experiments to determine the total separation efficiency achieved by the combinations of resin type, regenerant acid, and concentration thereof Samples taken during the loading stage for each of these column tests clearly demonstrated the existence of roll-over, in which zinc, during the latter part of a loading stage, displaced iron that had already bound to the resin in an earlier part of the loading stage. For example, AMBERLITE™ 200 was packed into a conventional ion exchange column, and a large volume relative to the column volume of a feed solution of constant composition was passed through the column more or less continuously. During this process, samples of the effluent were taken at intervals corresponding to cumulative feed volumes equal to certain multiples of the wet column bed volume, and the amounts of iron and zinc in these samples of effluent were determined by AA spectroscopy. The iron concentration in the effluent rose steadily with cumulated bed volume through about 40 bed volumes of total feed, then fluctuated somewhat, and eventually rose above the feed concentration and remained there between about 50 and 100 bed volumes. During this entire period, the zinc concentration in the effluent remained very low. The zinc concentration started to rise substantially only after the iron concentration in the effluent fell back to the value of the concentration in the feed after about 300 bed volumes of feed had passed through. These variations indicate that the zinc had rolled-over essentially all of the total amount of iron bound on the ion exchange resin by the time that about 300 bed volumes of feed had passed through the column, without any intermediate regeneration.

In additional tests with these three types of resins that had shown the best selectivity for zinc in batch equilibration tests, regeneration with repeated cycling, using the regenerants shown in Table 5, was performed. When several bed volumes of a fairly concentrated strong acid, such as 10% hydrochloric acid, is used as regenerant, more than 90% of all bound iron and zinc ions are stripped from all the resins. Some quantitative results are shown Table 5. The selectivities for zinc listed in Table 5 for the sulfonic acid and aminophosphonic resins are higher than the selectivities for the batch equilibrium studies reported in Table 4. This shows that roll-over improved the overall selectivity of the process.

The choice of regenerant can substantially impact the overall selectivity, especially when a weak acid is the regenerant. The selectivity for zinc shown in Table 5 for 2% hydrofluoric acid as the regenerant is lower than the selectivity for zinc of the same ion exchange resin in batch equilibration experiments as shown in Table 4. This shows that the choice of regenerant can negatively impact the overall selectivity, even when batch equilibrium selectivity is good and roll-over occurs.

TABLE 5

SELECTIVITY AND RELATED DATA, GROUP 5 WITH REGENERATION

| Ion Exchange Resin | Regenerant | Fe Removed from Resin, mg/L | Zn Removed from Resin, mg/L | Selectivity for Zinc |
|---|---|---|---|---|
| AMBERLITE 200 | 10% HCl in water | 2,170 | 46,650 | 89 |
| DUOLITE GT-73 | 2% HF in water | 421 | 927 | 10 |
| PUROLITE S-940 | 10% HCl in water | 1,160 | 5,749 | 19 |

Other examples of the effect of regenerant on overall selectivity are provided by the data in Table 2. The poor stripping efficiency for zinc from AMBERLITE™ 200 when 10% HF was used as the regenerant and the poor stripping efficiency of iron from PUROLITE™ S-940 when 10% HF was used as the regenerant are two notable examples of large absolute values of selectivity, the first against zinc and the second in favor of zinc, in regeneration. Thus proper choice of ion exchange resin type(s) and regenerant acid type(s) and concentration(s) can achieve almost any desired relationship between the input and output concentrations of iron, zinc, or other polyvalent cations that tend to accumulate in autodeposition baths.

EXAMPLE GROUP 6

In these examples and comparison examples, an autodeposition composition, substantially the same as Composition I defined above except for the addition of sufficient zinc fluoride, or of zinc ions spontaneously dissolved in the solution during autodeposition on galvanized steel, to give 300 ppm of zinc ions in the feed to the ion exchange resin columns, was used instead of the simpler, coating-resin-free solution used for Group 5. This permitted the practically important evaluation of the quality of autodeposited coating achieved after the autodepositing composition was passed through the bed of ion exchange resin.

In these tests, the feed solution as described above was passed through equal size and shape ion exchange columns filled with the ion exchange resins shown in Table 6. The effluent was periodically analyzed, and the experiment discontinued when the composition of the effluent essentially matched the concentration of the feed solution. The range of bed volumes and times required thus to saturate the ion exchange columns varied from 25 bed volumes and 3 hours for iminodiacetate resin to 400 bed volumes and 20 hours for the sulfonic acid resins.

The quality of the autodeposited coating produced with the cumulated effluent before the experiment was discontinued, which cumulated effluent had the concentration of zinc shown for the particular resin in Table 6, was then evaluated, using at least three test panels for each example of cumulated effluent. (The cumulated effluent had approximately the same concentration of iron as the feed solution, thereby closely conforming, except for the presence of zinc ions, to the composition of freshly made autodeposition Composition I, which contains a controlled amount of ferric iron as an oxidizing agent.) Some exemplary results are shown in Table 6, where individual runs are shown in order to give an idea of the experimental variation.

In general, it was found that the AMBERLITE™ 200 resin described above, even though highly selective for zinc, was not satisfactory for most purposes, because the coatings produced after passing through it had a gritty appearance, even if the autodeposition composition was filtered after passing through the ion exchange resin bed and before coating additional metal surfaces. However, a 10% cross-linked gel-form ion exchange resin with sulfonic acid groups, commercially supplied under the name AMBERLITE™ IR-122, in contrast to the macroreticular AMBERLITE™ 200 ion exchange resin which has the same type of functional groups, did not produce gritty appearing coatings and was also highly selective for zinc. Aminophosphonic acid and iminodiacetate type ion exchange resins were also satisfactory, although less preferred than the gel-type sulfonic acid ion exchange resins, for cleaning compositions with substantial concentrations of dissolved zinc ions.

Corrosion resistance tests of metal test panels bearing autodeposited coatings made by these compositions after passing through the gel type sulfonic acid, iminodiacetate, and aminophosphonic acid types of ion exchange resins were also fully as satisfactory as with autodeposition baths of the same initial chemical composition, exclusive of the zinc ions, that had never been contacted with any ion exchange resin.

TABLE 6

SOME RESULTS FROM GROUP 6

| Ion Exchange Resin Type | Capacity, mg/cm3 of Resin for: | | Selectivity for Zinc | Removal Rate, mg/cm$^3$ of Resin/ Hour for: | | Concentration in the Effluent Used for Coating, ppm of: | | Visible Grit Particles per Panel |
|---|---|---|---|---|---|---|---|---|
| | Fe | Zn | | Fe | Zn | Fe | Zn | |
| LEWATIT™ TP-207 | 15.19 | 8.90 | 2.7 | 2.27 | 1.33 | 1457 | 203 | 0–2 |
| | 15.57 | 9.19 | 2.9 | 2.28 | 1.35 | 1450 | 250 | 0–2 |
| | 15.48 | 7.42 | 2.6 | 2.33 | 1.12 | 1450 | 190 | 0–2 |
| AMBERLITE™ | 1.50 | 41.94 | 137.9 | 0.10 | 2.87 | 1741 | 213 | >10 |

TABLE 6-continued

SOME RESULTS FROM GROUP 6

| Ion Exchange Resin Type | Capacity, mg/cm3 of Resin for: | | Selectivity for Zinc | Removal Rate, mg/cm³ of Resin/ Hour for: | | Concentration in the Effluent Used for Coating, ppm of: | | Visible Grit Particles per Panel |
|---|---|---|---|---|---|---|---|---|
| | Fe | Zn | | Fe | Zn | Fe | Zn | |
| 200 | | | | | | | | |
| DUOLITE ™ | 0.64 | 3.15 | 22.7 | 0.15 | 0.74 | 1573 | 226 | 0–2 |
| C-467 | 0.45 | 5.19 | 48.7 | 0.09 | 1.03 | 1520 | 220 | 0–2 |
| | 1.03 | 5.01 | 22.6 | 0.17 | 0.81 | 1425 | 220 | 0–2 |
| AMBERLITE ™ | 1.69 | 60.06 | 170.1 | 0.09 | 3.13 | 1820 | 224 | 0–2 |
| IR-122 | 1.40 | 58.50 | 272.9 | 0.17 | 4.00 | 1530 | 150 | 0–2 |

Zinc ions can be readily displaced from the ion exchange resins to which they are bound by treatment with acids as already described in general terms above. In contrast to the situation with iron bound on iminodiacetate type ion exchange resins, 10% HCl is considerably preferred over 2% HF for the displacement of zinc from sulfonic acid and phosphonic acid type resins and for the displacement of iron from the gel type sulfonic acid resins. Displacement of iron from the other resins tested with acids is difficult, so that it is preferable to displace substantially all the iron from these resins with zinc containing autodeposition bath to be recycled, then remove any excess iron by passing the composition through a bed of iminodiacetate ion exchange resin, where the iron is efficiently removed and can be efficiently displaced by later regeneration with hydrofluoric acid as already noted above.

The invention claimed is:

1. A process for selectively extracting zinc ions from a used autodeposition bath containing both zinc and iron ions dissolved therein, and then reusing the bath reduced in its content of zinc ions, to coat a metal surface with an autodeposited coating wherein said coating after drying is smooth, said process comprising the steps of:
   (I) without adding a dispersing agent selected from the group consisting of cationic surfactants, amphoteric surfactants, and protective colloids to a volume of used autodeposition bath containing both zinc and iron ions dissolved therein, placing at least 30% by volume of said used autodeposition bath into contact with a sufficient amount of a cation exchange resin having reversibly bound thereon hydrogen and iron cations, said cation exchange resin being selected from the group consisting of cation exchange resins having iminodiacetate functional groups, cation exchange resins having aminophosphonic acid functional groups, cation exchange resins having thiol functional groups, and styrene-divinyl benzene copolymer gel type cation exchange resins having sulfonic acid functional groups, so as to transfer to said ion exchange resin at least part of the content of dissolved zinc cations in said volume of used autodeposition bath and substitute an equivalent amount of dissolved hydrogen and dissolved iron cations in said volume of used autodeposition bath, wherein said cation exchange resin is loaded with zinc ions and iron ions to a point within the range of from about 50% to about 99% of its saturation capacity for the zinc ions and iron ions, said cation exchange resin so loaded is subjected to regeneration, wherein said regeneration comprises at least one regeneration step selected from the group consisting of:
   (A) the selective displacement of zinc cations to a greater extent than iron cations from the loaded cation exchange resin by placing the loaded resin in contact with an aqueous solution of acid, so that the displaced zinc ions and, optionally, displaced iron cations, on the loaded resin are replaced by hydrogen ions, thereby producing an at least partially regenerated acid form of the cation exchange resin and
   (B) the selective displacement of iron cations to a greater extent than zinc cations from the loaded cation exchange resin by contacting the loaded resin with a used autodeposition bath containing dissolved zinc ions, so that the iron ions displaced from the loaded resin are replaced by zinc ions; then
   (II) contacting said used autodeposition bath treated as in step (I) with an additional metal surface, said metal surface being selected from the group consisting of ferriferous and zinciferous metal surfaces, for a sufficient time to form an autodeposition coating on said additional metal surface, and then
   (III) drying said coating to form a smooth coating on said additional metal surface.

2. A process according to claim 1, wherein said cation exchange resin is a styrene-divinyl benzene copolymer gel type cation exchange resin having sulfonic acid functional groups and from 8% to 16% of cross linking.

3. A process according to claim 2 wherein said regeneration comprises the selective displacing of zinc cations to a greater extent than iron cations from said loaded cation exchange with an aqueous solution of hydrochloric acid in water.

4. A process according to claim 3, wherein said used autodeposition bath comprises:
   (A) from 5 g/L to 550 g/L of a stably dispersed organic coating resin;
   (B) from about 0.4 g/L to about 5 g/L of fluoride ions;
   (C) an amount sufficient to provide from about 0.010 to about 0.20 oxidizing equivalents per liter of an oxidizing agent selected from the group consisting of dichromate, hydrogen peroxide, ferric ions, and mixtures thereof; and
   (D) a source of hydrogen ions in an amount sufficient to impart to the autodeposition composition a pH in the range from about 1.6 to about 3.8.

5. A process according to claim 4, wherein said used autodeposition bath comprises:
   (A) from 40 g/L to 120 g/L of a stably dispersed organic coating resin selected from the group consisting of (i)

internally and externally stabilized copolymers of vinylidene chloride containing at least 80% of residues from polymerizing vinylidene chloride and (ii) copolymers of acrylonitrile;

(B) from about 1.0 g/L, to about 3.0 g/L of fluoride ions;

(C) from about 0.012 to about 0.045 oxidizing equivalents per liter of oxidizing agent selected from the group consisting of hydrogen peroxide, ferric ions, and mixtures thereof; and (D) a source of hydrogen ions in an amount sufficient to impart to said autodeposition composition a pH in the range from about 1.7 to about 3.0.

6. A process according to claim 2, wherein said used autodeposition bath comprises:

(A) from 5 g/L to 550 g/L of a stably dispersed organic coating resin;

(B) from about 0.4 g/L to about 5 g/L of fluoride ions;

(C) an amount sufficient to provide from about 0.010 to about 0.20 oxidizing equivalents per liter of an oxidizing agent selected from the group consisting of dichromate, hydrogen peroxide, ferric ions, and mixtures thereof; and (D) a source of hydrogen ions in an amount sufficient to impart to the autodeposition composition a pH in the range from about 1.6 to about 3.8.

7. A process according to claim 6, wherein said used autodeposition bath comprises:

(A) from 40 g/L to 120 g/L of a stably dispersed organic coating resin selected from the group consisting of (i) internally and externally stabilized copolymers of vinylidene chloride containing at least 80% of residues from polymerizing vinylidene chloride and (ii) copolymers of acrylonitrile;

(B) from about 1.0 g/L to about 3.0 g/L of fluoride ions;

(C) from about 0.012 to about 0.045 oxidizing equivalents per liter of oxidizing agent selected from the group consisting of hydrogen peroxide, ferric ions, and mixtures thereof; and (D) a source of hydrogen ions in an amount sufficient to impart to the autodeposition composition a pH in the range from about 1.7 to about 3.0.

8. A process according to claim 1 wherein the cationic exchange resin is a styrene-divinyl benezene copolymer gel type cation exchange resin having sulfonic acid functional groups and from 6% to 20% of crosslinking.

9. A process according to claim 8 wherein said regeneration comprises the selective displacing of zinc cations to a greater extent than iron cations from said loaded cation exchange resin with an aqueous solution of hydrochloric acid.

10. A process according to claim 9, wherein said used autodeposition bath comprises:

(A) from about 5 g/L to about 550 g/L of a stably dispersed organic coating resin;

(B) from about 0.4 g/L to about 5 g/L of fluoride ions;

(C) an amount sufficient to provide from about 0.010 to about 0.20 oxidizing equivalents per liter of an oxidizing agent selected from the group consisting of dichromate, hydrogen peroxide, ferric ions, and mixtures thereof; and (D) a source of hydrogen ions in an amount sufficient to impart to the autodeposition composition a pH in the range from about 1.6 to about 3.8.

11. A process according to claim 10, wherein said used autodeposition bath comprises:

(A) from about 40 g/L to about 120 g/L of a stably dispersed organic coating resin selected from the group consisting of (i) internally and externally stabilized copolymers of vinylidene chloride containing at least 80% of residues from polymerizing vinylidene chloride and (ii) copolymers of acrylonitrile;

(B) from about 1.0 g/L to about 3.0 g/L of fluoride ions;

(C) from about 0.012 to about 0.045 oxidizing equivalents per liter of oxidizing agent selected from the group consisting of hydrogen peroxide, ferric ions, and mixtures thereof; and (D) a source of hydrogen ions in an amount sufficient to impart to the autodeposition composition a pH in the range from about 1.7 to about 3.0.

12. A process according to claim 8, wherein said used autodeposition bath comprises:

(A) from about 5 g/L to about 550 g/L of a stably dispersed organic coating resin;

(B) from about 0.4 g/L to about 5 g/L of fluoride ions;

(C) an amount sufficient to provide from about 0.010 to about 0.20 oxidizing equivalents per liter of an oxidizing agent selected from the group consisting of dichromate, hydrogen peroxide, ferric ions, and mixtures thereof; and (D) a source of hydrogen ions in an amount sufficient to impart to the autodeposition composition a pH in the range from about 1.6 to about 3.8.

13. A process according to claim 12, wherein said used autodeposition bath comprises:

(A) from 40 g/L to 120 g/L of a stably dispersed organic coating resin selected from the group consisting of (i) internally and externally stabilized copolymers of vinylidene chloride containing at least 80% of residues from polymerizing vinylidene chloride and (ii) copolymers of acrylonitrile;

(B) from about 1.0 g/L to about 3.0 g/L of fluoride ions;

(C) from about 0.012 to about 0.045 oxidizing equivalents per liter of oxidizing agent selected from the group consisting of hydrogen peroxide, ferric ions, and mixtures thereof; and (D) a source of hydrogen ions in an amount sufficient to impart to the autodeposition composition a pH in the range from about 1.7 to about 3.0.

14. A process according to claim 1 wherein said used autodeposition bath comprises:

(A) from about 5 g/L to about 550 g/L of a stably dispersed organic coating resin;

(B) from about 0.4 g/L to about 5 g/L of fluoride ions;

(C) an amount sufficient to provide from about 0.010 to about 0.20 oxidizing equivalents per liter of an oxidizing agent selected from the group consisting of dichromate, hydrogen peroxide, ferric ions, and mixtures thereof; and (D) a source of hydrogen ions in an amount sufficient to impart to the autodeposition composition a pH in the range from about 1.6 to about 3.8.

15. A process according to claim 14, wherein said used autodeposition bath comprises:

(A) from about 40 g/L to about 120 g/L of a stably dispersed organic coating resin selected from the group consisting of (i) internally and externally stabilized copolymers of vinylidene chloride containing at least 80% of residues from polymerizing vinylidene chloride and (ii) copolymers of acrylonitrile;

(B) from about 1.0 g/L to about 3.0 g/L of fluoride ions;

(C) from about 0.012 to about 0.045 oxidizing equivalents per liter of oxidizing agent selected from the group consisting of hydrogen peroxide, ferric ions, and mixtures thereof; and (D) a source of hydrogen ions in an amount sufficient to impart to the autodeposition composition a pH in the range from about 1.7 to about 3.0.

16. A process according to claim 15, wherein said used autodeposition bath comprises:

(A) from about 5 g/L to about 550 g/L of a stably dispersed organic coating resin;

(B) from about 0.4 g/L to about 5 g/L of fluoride ions;

(C) an amount sufficient to provide from about 0.010 to about 0.20 oxidizing equivalents per liter of an oxidizing agent selected from the group consisting of dichromate, hydrogen peroxide, ferric ions, and mixtures thereof; and (D) a source of hydrogen ions in an amount sufficient to impart to the autodeposition composition a pH in the range from about 1.6 to about 3.8.

17. A process according to claim 16, wherein said used autodeposition bath comprises:

(A) from about 40 g/L to about 120 g/L of a stably dispersed organic coating resin selected from vinylidene chloride containing at least 80% of residues from polymerizing vinylidene chloride and (ii) copolymers of acrylonitrile;

(B) from about 1.0 to about 3.0 g/L of fluoride ions;

(C) from about 0.012 to about 0.045 oxidizing equivalents per liter of oxidizing agent selected from the group consisting of hydrogen peroxide, ferric ions, and mixtures thereof; and (D) a source of hydrogen ions in an amount sufficient to impart to the autodeposition composition a pH in the range from about 1.7 to about 3.0.

18. A process according to claim 1, wherein the said selective displacing of zinc cations bound to the ion exchange resin and the said selective displacing of iron cations bound to the ion exchange resin are alternated as needed to permit recycling of the autodeposition bath.

19. A process according to claim 18, wherein zinc is selectively displaced from said ion exchange resin by contacting the ion exchange resin with an aqueous solution of acid and iron is selectively displaced from said ion exchange resin by contacting the ion exchange resin with used autodeposition composition containing dissolved zinc ions.

* * * * *